US011301925B1

(12) United States Patent
Marhel et al.

(10) Patent No.: US 11,301,925 B1
(45) Date of Patent: Apr. 12, 2022

(54) USER INTERFACE FOR PRESENTING PROVIDER INFORMATION TO DESIGNERS AND/OR AUTHORS

(71) Applicant: Printify, Inc., Riga (LV)

(72) Inventors: Daniel Marhel, Riga (LV); Juris Brudnis, Riga (LV); Vitor Silva, Riga (LV)

(73) Assignee: Printify, Inc., Riga (LV)

( * ) Notice: Subject to any disclaimer, the term of this patent is extended or adjusted under 35 U.S.C. 154(b) by 37 days.

(21) Appl. No.: 17/009,729

(22) Filed: Sep. 1, 2020

(51) Int. Cl.
  *G06Q 30/06* (2012.01)
  *G06F 3/0484* (2013.01)
  *G06F 3/04842* (2022.01)
  *G06Q 10/08* (2012.01)

(52) U.S. Cl.
  CPC ..... *G06Q 30/0643* (2013.01); *G06F 3/04842* (2013.01); *G06Q 30/0621* (2013.01); *G06Q 10/08345* (2013.01)

(58) Field of Classification Search
  None
  See application file for complete search history.

(56) References Cited

U.S. PATENT DOCUMENTS

| | | | | |
|---|---|---|---|---|
| 6,167,382 A * | 12/2000 | Sparks | ........... | G06F 40/103 705/14.73 |
| 8,958,663 B1 * | 2/2015 | Harvill | ........... | G06K 19/08 382/318 |
| 8,959,422 B2 * | 2/2015 | Norwood | ........... | G06F 16/9535 715/202 |
| 9,672,550 B2 * | 6/2017 | Apsley | ........... | G06F 30/20 |
| 9,787,861 B2 * | 10/2017 | Chen | ........... | H04N 1/00167 |
| 10,922,449 B2 * | 2/2021 | Bowen | ........... | G06K 9/6253 |
| 2012/0284594 A1 * | 11/2012 | Norwood | ........... | G06F 3/0481 715/202 |
| 2013/0103529 A1 * | 4/2013 | Loveman | ........... | G06Q 30/08 705/26.2 |
| 2015/0052025 A1 * | 2/2015 | Apsley | ........... | G06Q 10/08 705/26.81 |

(Continued)

OTHER PUBLICATIONS

Kamis, A., et al., "A flow-based model of web site intentions when users customize products in business-to-consumer electronic commerce," Information Systems Frontiers, 12.2:157-168. Springer Nature B.V. (Apr. 2010). (Year: 2010).*

*Primary Examiner* — Nicholas D Rosen
(74) *Attorney, Agent, or Firm* — John C. Pokotylo; Pokotylo Patent Services

(57) ABSTRACT

User interface technology related to a composite file or page (e.g., Webpage) including information from various entities (e.g., physical product providers) may be improved by providing a composite score (determined from one or more constituent parts) for each of the entities in a way that occupies less space than would otherwise been needed if constituent scores of each of the entities were provided. Such example embodiments may also improve user interface technology by reducing the cognitive load on a user reviewing information presented on a composite Webpage. This, in turn, reduces "friction" related to using and interacting with such a composite Webpage. Such example embodiments may also improve user interface technology by presenting information from various different entities in a uniform manner, with a consistent look and feel.

24 Claims, 14 Drawing Sheets

(56) References Cited

U.S. PATENT DOCUMENTS

| | | | | |
|---|---|---|---|---|
| 2017/0094072 A1* | 3/2017 | Chen | ............... | H04N 1/00461 |
| 2020/0159871 A1* | 5/2020 | Bowen | ............... | G06F 30/12 |
| 2020/0358783 A1* | 11/2020 | Beaver, III | ........... | G06Q 10/101 |

* cited by examiner

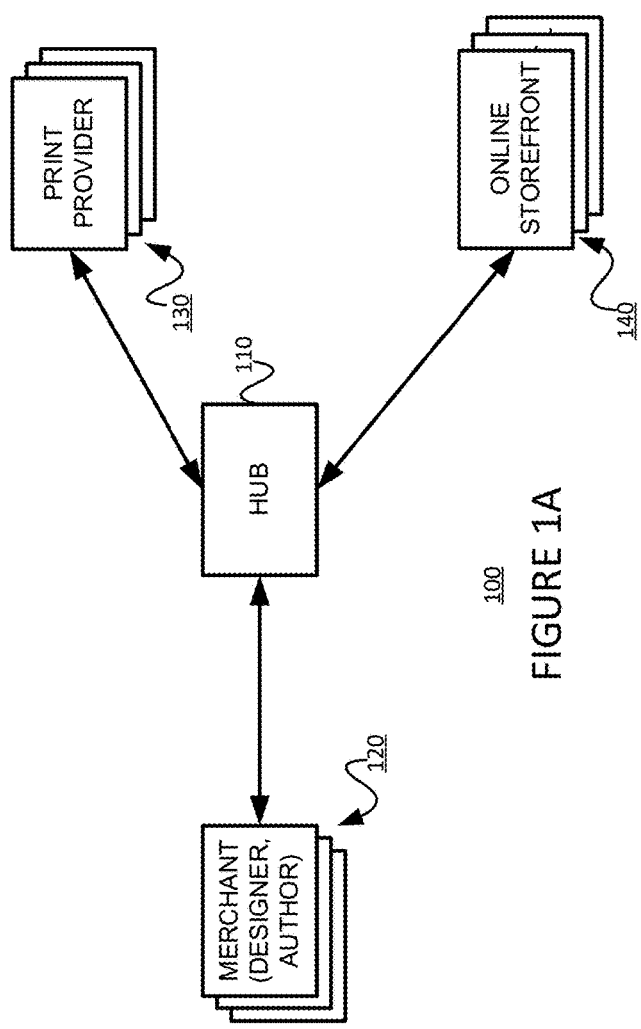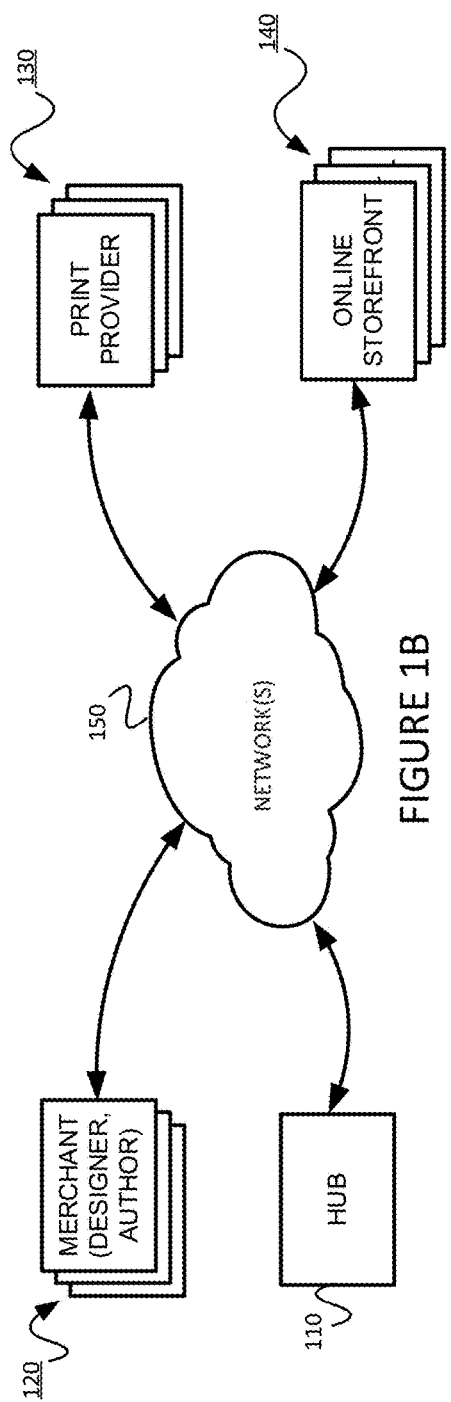
FIGURE 1A
FIGURE 1B

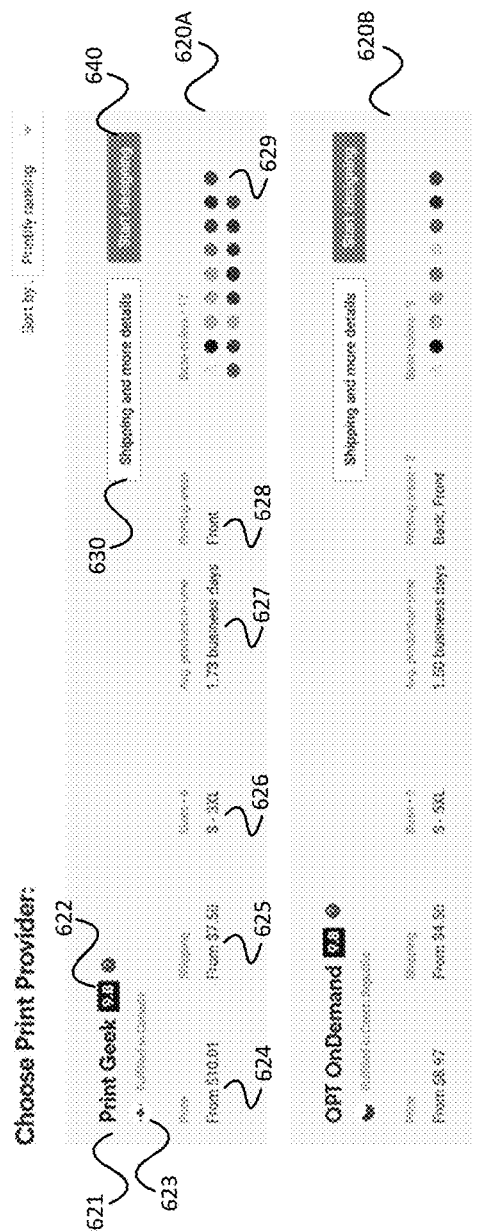
FIGURE 6A
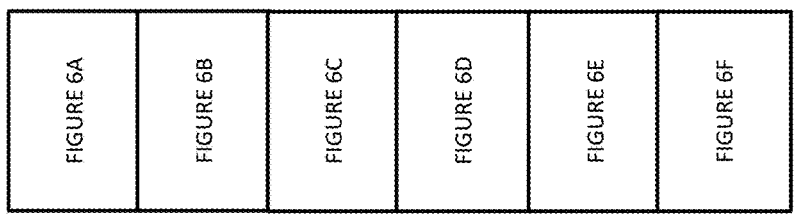
FIGURE 6

USER INTERFACE FOR PRESENTING PROVIDER INFORMATION TO DESIGNERS AND/OR AUTHORS

BACKGROUND OF THE INVENTION

Field of the Invention

The present description concerns user interface technology. In particular, the present description concerns improving user interface technology related to a composite file (e.g., a composite HTML Webpage) including information from various entities.

Background Information

User interfaces are often used to render information to a user, and/or to receive information from the user. As one example, a user interface may be provided in the form of a Webpage (or more generally, a "page" or "file") including information from various entities (e.g., sellers of physical products, digital creative products, services, etc.). In some cases, each of the entities is associated with a score, often reflecting some combination (e.g., an average) of user review scores.

Although useful, users often want more information about entities than scores reflecting a simple combination of user review scores. Users can sometimes find more information about entities from written user reviews, answered questions, etc. However, drilling down into such further information often requires navigating to and from additional Webpages, and/or navigating withing a large Webpage. Additional information may also require more space and/or time (e.g., screen space in visually rendered information and/or more time in information rendered via audio and/or video). This increases the cognitive load on the user when interacting with the user interface. Such an increase in cognitive load degrades the user's experience and increases "friction" related to using the Webpage and/or consummating a transaction on a Website including the Webpage. These factors may make a user less likely to use a user interface, and may make it less likely that a user will consummate a transaction through the user interface.

Thus, it would be useful to improve user interface technologies to avoid or minimize one or more of the foregoing problems.

SUMMARY OF THE INVENTION

The problem of difficult user interfaces is solved by providing a computer-implemented method comprising: (a) transmitting, for rendering on a user device, a first user interface screen including a plurality of candidate physical products on which to reproduce a design; (b) receiving, from the user device, a selection input to select one of the plurality of candidate physical products, thereby defining a selected physical product; (c) responsive to receiving the selection input, retrieving a set of candidate provider information for each of at least one candidate provider of the selected physical product, each set of candidate provider information including (1) a minimum price associated with both the candidate provider and the selected physical product and (2) a candidate provider score; (d) transmitting, for rendering on the user device, a second user interface screen including the at least one set of candidate provider information retrieved; (e) receiving, from the user device, a user selection of one of the at least one set of candidate provider information, thereby defining a selected provider; (f) transmitting, for rendering on the user device, a third user interface screen for assisting the user to create a designed product; (g) receiving, from the user device, user product design inputs; and (h) generating an order file including information derived from the user product design inputs received and the selected physical product.

In some example embodiments, the computer-implemented method may further include (i) transmitting the order file to the selected provider. Some such example embodiments may further include (j) publishing at least some of the information in the order file to at least one online store platform.

In at least some example embodiments, the candidate provider score is a function of (1) an objective score, and/or (2) a subjective score. In at least some such embodiments, the objective score is a function of both (1) a product poor quality score (which may be a function of one or more of reprint percentages, late shipping percentages, end user refund percentages, etc.) associated with the candidate provider, and (2) a delayed production score associated with the candidate provider.

In some example embodiments, the product reprint score associated with the candidate provider may be determined using a ratio of number of reprints of the selected physical product by the candidate provider to a number of orders of the selected physical product from the candidate provider. As another example, the product reprint score associated with the candidate provider is determined using time weighted ratios of number of reprints of the selected physical product by the candidate provider to a number of orders of the selected physical product from the candidate provider. As yet another example, the product reprint score associated with the candidate provider is determined using a ratio of number of reprints of a category of products to which the selected physical product belongs by the candidate provider to a number of orders of the category of products to which the selected physical product belongs from the candidate provider.

In some example embodiments, the delayed production score associated with the candidate provider is determined using (1) at least one service level agreement violation count of the selected physical product fulfilled by the candidate provider, and (2) a total count of the selected physical product fulfilled by the candidate provider. As another example, the delayed production score associated with the candidate provider is determined using (1) a weighed combination of service level agreement violation counts of the selected physical product fulfilled by the candidate provider, and (2) a total count of the selected physical product fulfilled by the candidate provider, wherein service level agreement violation counts associated with longer delays are weighted more heavily than service level agreement violation counts associated with shorter delays. In yet another example, the delayed production score associated with the candidate provider is determined using (1) at least one service level agreement violation count of a category of products to which the selected physical product belongs fulfilled by the candidate provider, and (2) a total count of a category of products to which the selected physical product belongs fulfilled by the candidate provider. In still yet another example, the delayed production score associated with the candidate provider is determined using (1) a weighed combination of service level agreement violation counts of a category of products to which the selected physical product belongs fulfilled by the candidate provider, and (2) a total count of a category of products to which the selected physical product belongs fulfilled by the candidate provider, wherein service level agreement violation counts associated with longer delays are weighted more heavily than service level agreement violation counts associated with shorter delays.

In at least some example embodiments, the subjective score is a function of user-provided ratings associated with the candidate provider. In at least some such examples, the user-provided ratings associated with the candidate provider are a function of (1) quality ratings of the selected physical product provided by the candidate provider as a sample printed product, (2) a quality rating of printing of the sample printed product, and (3) a fulfillment rating corresponding to the sample printed product.

In at least some example embodiments, each set of candidate provider information further includes (1) a minimum shipping price for the selected physical product, (2) a production time value for the selected physical product, (3) one or more areas of the selected physical product on which the design in the digital design file may be reproduced by the candidate provider, (4) a geographic area in which the candidate provider delivers the selected physical product, and/or (5) base colors of the selected physical product offered by the candidate provider.

In at least some example embodiments, each of the at least one set of candidate provider information rendered on the second user interface screen has the same look and feel, regardless of the candidate provider.

In at least some example embodiments, each of the at least one set of candidate provider information rendered on the second user interface screen includes a visually perceptible minimum price element and a visually perceptible candidate provider score element.

In at least some example embodiments, each of the at least one set of candidate provider information rendered on the second user interface screen are sorted and/or filtered based on their corresponding candidate provider scores.

BRIEF DESCRIPTION OF THE DRAWINGS

FIGS. 1A and 1B illustrate an example environment in which example embodiments consistent with the present description may be used.

DETAILED DESCRIPTION

Figure 2:
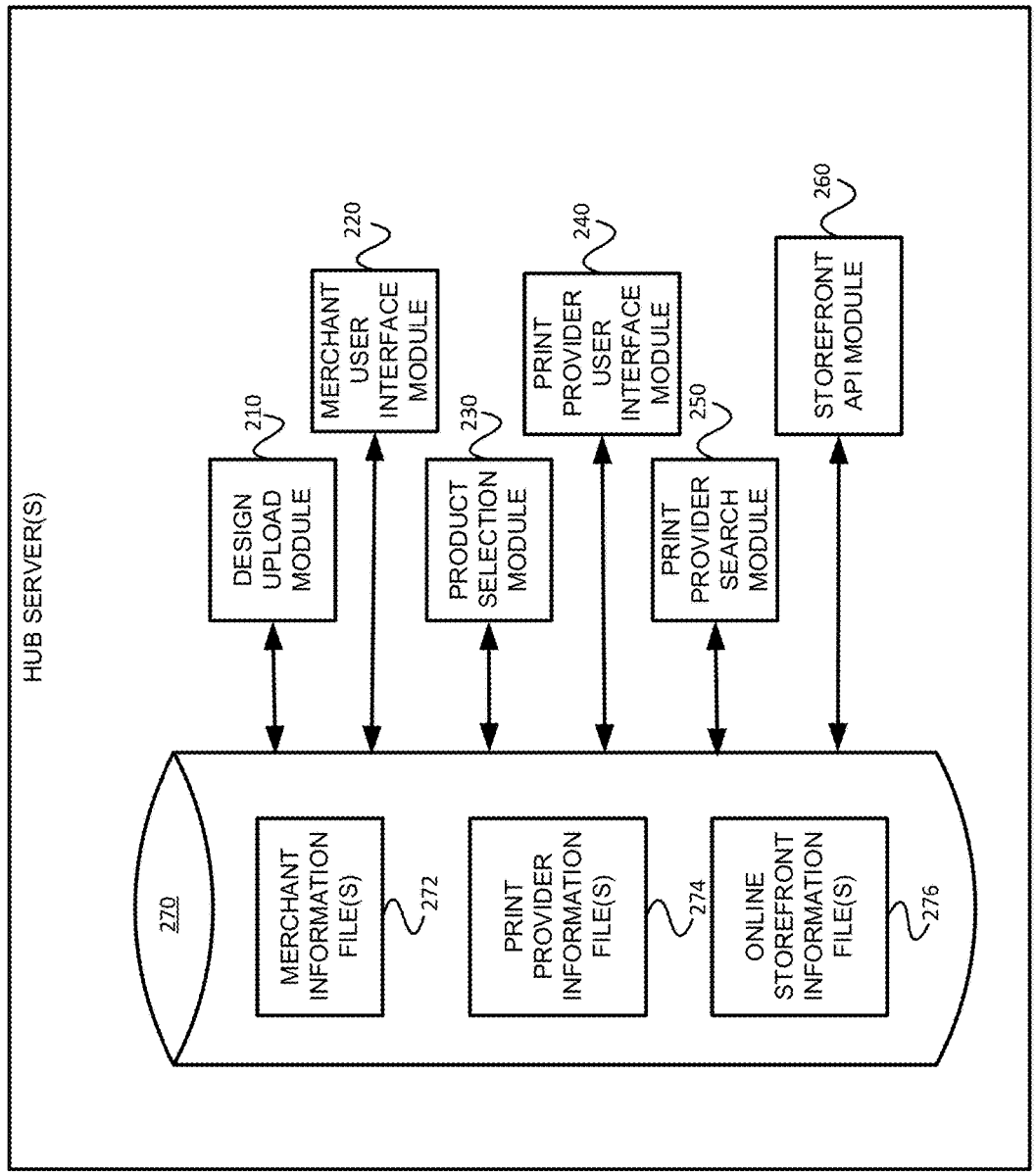
FIG. 2 illustrates an example hub server(s) consistent with the present description.

The present description may involve novel methods, apparatus, message formats, and/or data structures for improving user interface technology. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

Example Environment

FIGS. 1A and 1B illustrate an example environment 100 in which example embodiments consistent with the present description may be used. Referring first to FIG. 1A, a hub 110 may interact with one or more merchants (e.g., designers and/or authors) 120, one or more print providers 130, and one or more online storefronts 140. Referring to FIG. 1B, the hub 110 may communicate with each of these entities 120, 130, 140 via one or more networks 150, such as the Internet for example.

FIG. 2 illustrates an example hub server(s) 110' consistent with the present description. As shown, the example hub server(s) 110' may include a design upload module 210, a merchant (e.g., a designer and/or an author) user interface module 220, a product selection module 230, a print provider user interface module 240, a print provider search module 250, a storefront application program interface (API) module 260, and various stored information 270. The various stored information 270 may include merchant information files 272, print provider information files 274 and online storefront information files 276. Operations performed by the foregoing modules and the types of information stored will be described later.

Figure 3:
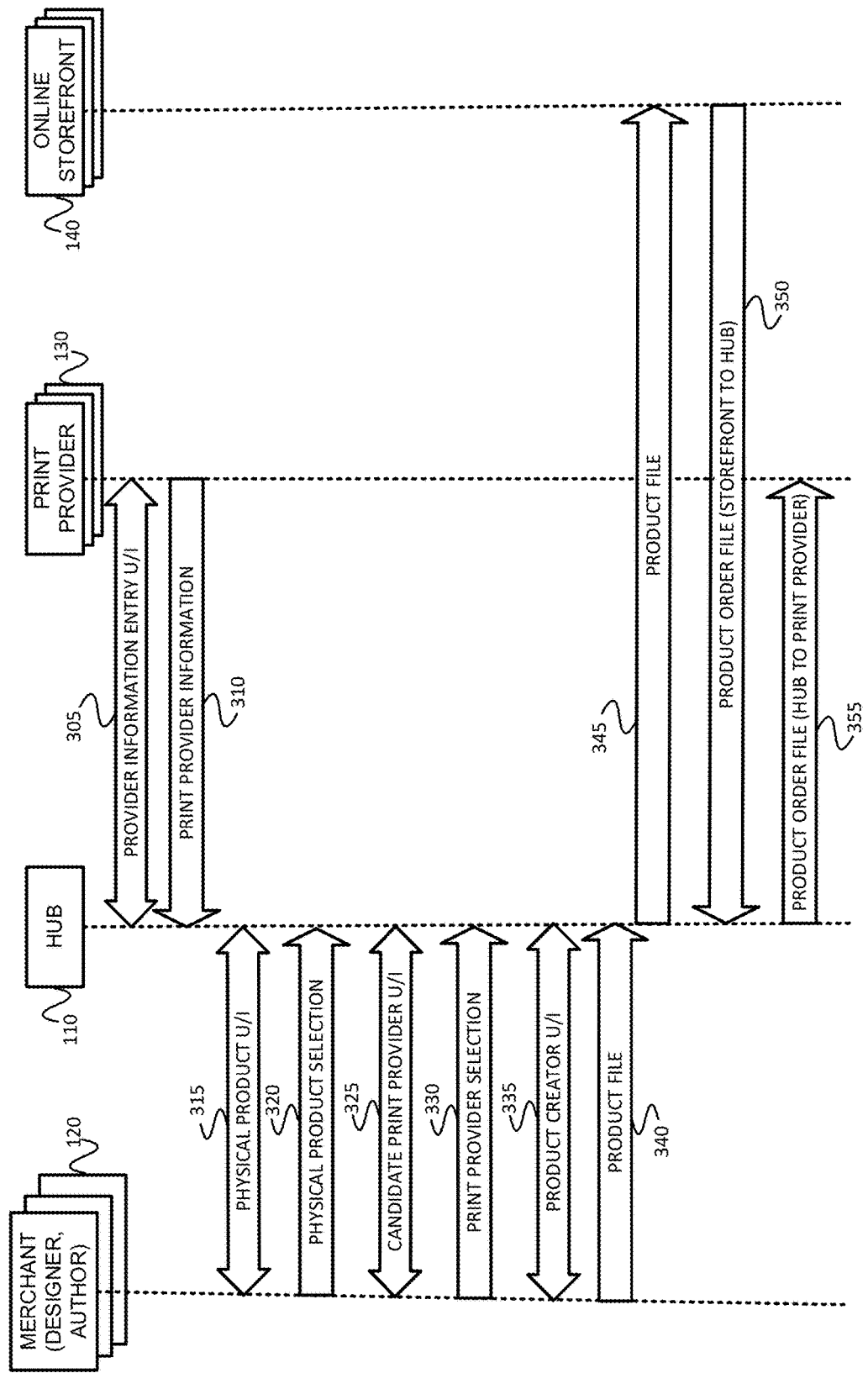
FIG. 3 illustrates communications among various parts of the example system of FIGS. 1A and 1B.

FIG. 3 illustrates communications among various parts of the example system 100 of FIGS. 1A and 1B. A print prover 130 may interact with the hub 110 via communications 305 related to a provider information entry user interface. Ultimately, the print provider 130 provides information about itself to the hub 110 via communication(s) 310.

Still referring to FIG. 3, a merchant (e.g., designer and/or author) 120 may interact with the hub 110 via communications 315 associated with a physical product selection user interface. An example of such a user interface will be described later with reference to FIG. 5. The merchant 120 may select a physical product (on which to render its design(s)) to the hub 110 via communication(s) 320. Then, the merchant 120 may further interact with the hub 110 via communications 325 associated with a print provider selection user interface. An example of such a user interface will be described later with reference to FIG. 6 (which includes FIGS. 6A-6E). The merchant 120 may select a physical print provider among those presented via communications 330. Then, the merchant 120 may further interact with the hub 110 via communications 335 associated with a product creator user interface. An example of such a user interface will be described later with reference to FIGS. 9A and 9B. Finally, the merchant 120 may provide information for a product file (or as a product file) to the hub 110 via communication(s) 340.

Still referring to FIG. 3, the hub 110 may provide product file information to an online storefront 140 via communication(s) 345. Although not shown, the hub 110 may also provide product file information to a print provider 130. Alternatively, such product file information may be provided directly from the merchant (e.g., designer and/or author) 120. The product file communicated to the print provider 130 and/or the product file communicated to the online storefront 140 may be the same as, or different from, the product file provided from the merchant 120. Further, a product file communicated to the print provider 130 may be different from a product file communicated to the online storefront 140. The various product information files may include subsets of aggregated product information.

When the online storefront 140 receives an order for the product, it may send a product order file (storefront to hub) to the hub 110 via communication 350. The hub 110 may then send product order information (hub to print provider) to the print provider 130 via communication 355. Alternatively, when the online storefront 140 receives an order for the product, it may send a product order file to both the hub 110 and directly to the print provider 130. Although not shown, one or more order status notifications (e.g., order receipt, order fulfillment, order shipping, etc.) may be provided to the merchant 120, either directly from the online storefront 140 and/or the print provider 130, or indirectly via the hub 110.

Example Methods and User Interface Screens

Figure 4:
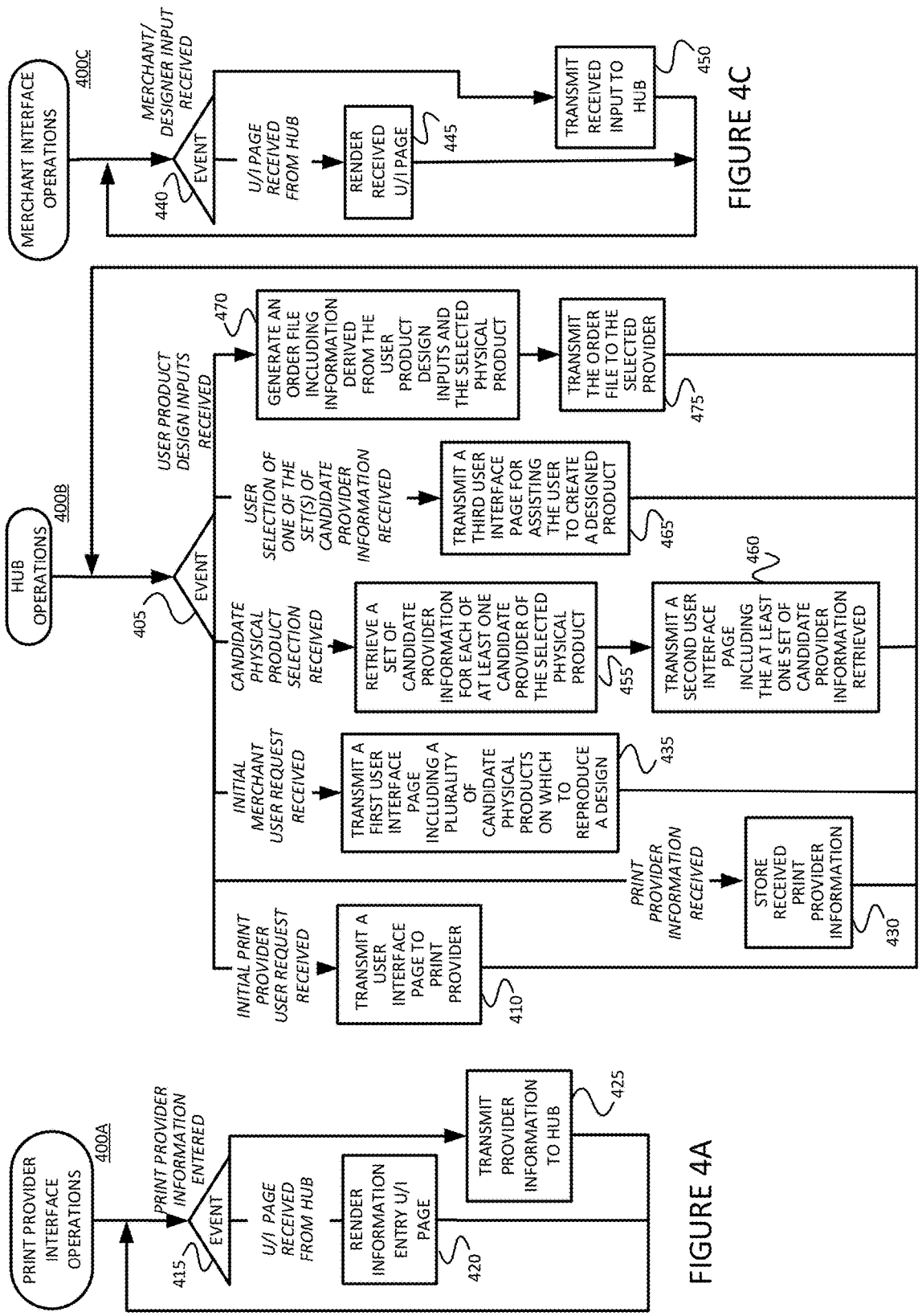
FIGS. 4A-4C illustrate flow diagrams of example methods for performing print provider interface operations, hub operations, and merchant (e.g., designer and/or author) user interface operations, respectively, in a manner consistent with the present description.

FIGS. 4A-4C illustrate flow diagrams of example methods 400A, 400B and 400C, for performing print provider interface operations, hub operations, and merchant (e.g., designer and/or author) interface operations, respectively, in a manner consistent with the present description. Different branches of the example method 400A are performed responsive to the occurrence of certain events 415. Similarly, different branches of the example method 400B are performed responsive to the occurrence of certain events 405, and different branches of the example method 400C are performed responsive to the occurrence of certain events 440.

Referring first to event 405, responsive to receiving an initial print provider user request (left-most branch of method 400B), the example method 400B transmits a user interface page to the print provider (Block 410). Referring back to FIG. 2, this may be performed by the print provider user interface module 240. Referring to event 415, responsive to receiving this user interface page, the example method 400A renders it. (Block 420) When the print provider enters its information, the example method 400A transmits this information back to the hub. (Block 425) Although not shown, the information requested from, and entered by, the print provider may include, for example, products offered by the print provider, and for each of the products offered, base colors of the product available from the print provider, price charged by the print provider, shipping costs charged by the print provider, sizes offered by the print provider, printing areas on the product, etc. Referring back to event 405, responsive to receiving the print provider information, the example method 400B may store the received information. (Block 430) Referring back to FIG. 2, this information may be stored as a print provider information file 274. These acts correspond to communications 305 and 310 of FIG. 3. Note that the print provider may provide initial set up information to the hub, and later provide updated and/or further information (e.g., on a live basis via streaming when a condition is met, periodically, etc.). In this way, live information can be streamed to a merchant via the hub.

Figure 5:
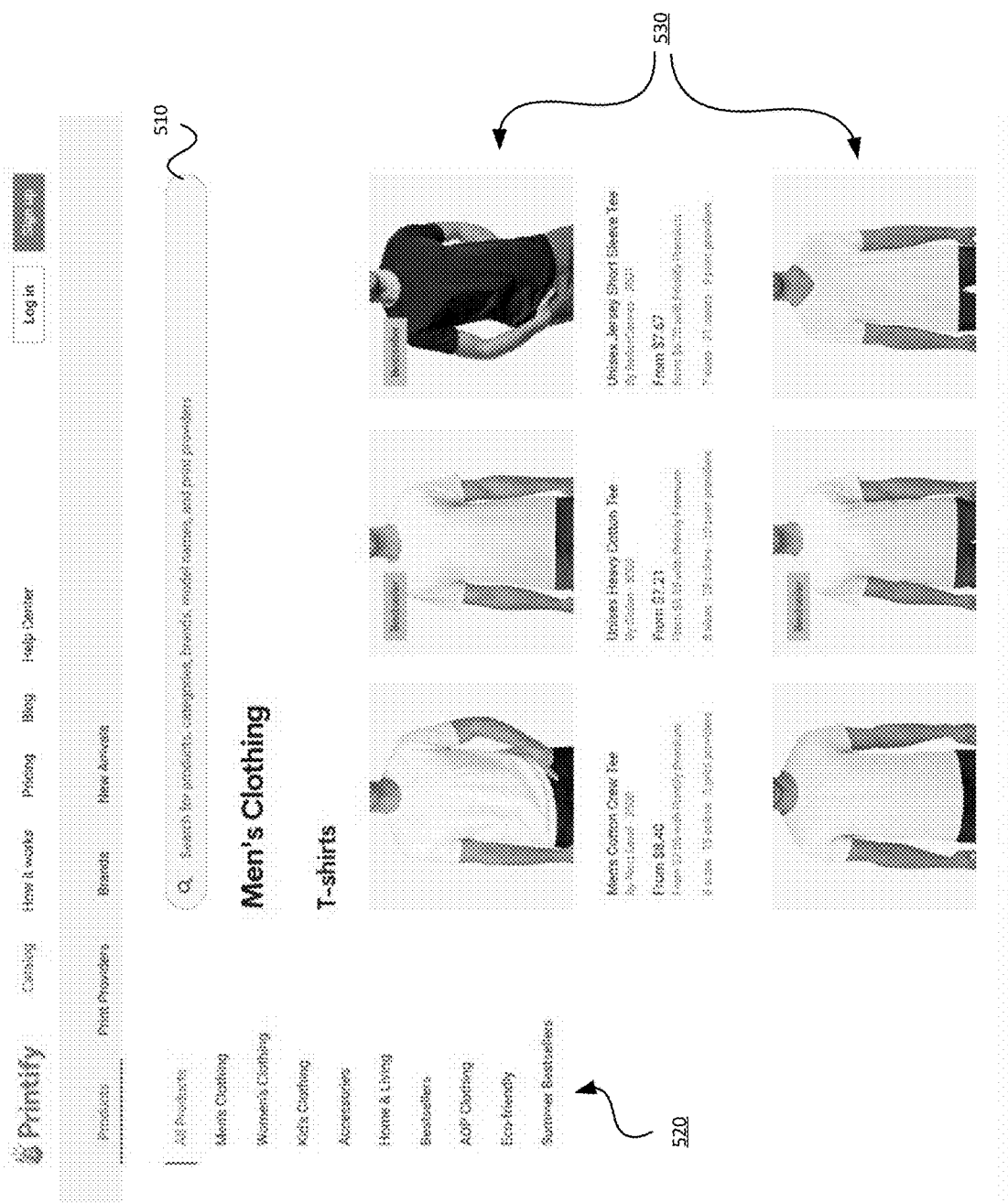
FIG. 5 illustrates part of an example first user interface page.

Referring back to event 405, responsive to receiving an initial merchant (e.g., designer and/or author) user request, the example method 400B transmits a first user interface page, including a plurality of candidate physical products on which the merchant's design may be reproduced, to the merchant. (Block 435) Referring to event 440, responsive to receiving the first user interface page, example method 400C renders the received user interface page. (Block 445) FIG. 5 illustrates a portion 500 of an example of such a user interface page. Products can be searched for by entering a text search in element 510, or browsed by category links 520. The initial page (not shown), may include a collection of products. In one example, the collection of products may be arranged based on popularity, expected revenue, etc. The example portion 500 shows some of the available men's t-shirt products 530. Assume that the merchant selects one of the products. Again, referring to event 440, the example method 400C transmits this received input back to the hub. (Block 450) These acts correspond to communications 315 and 320 of FIG. 3.

Figure 6B:
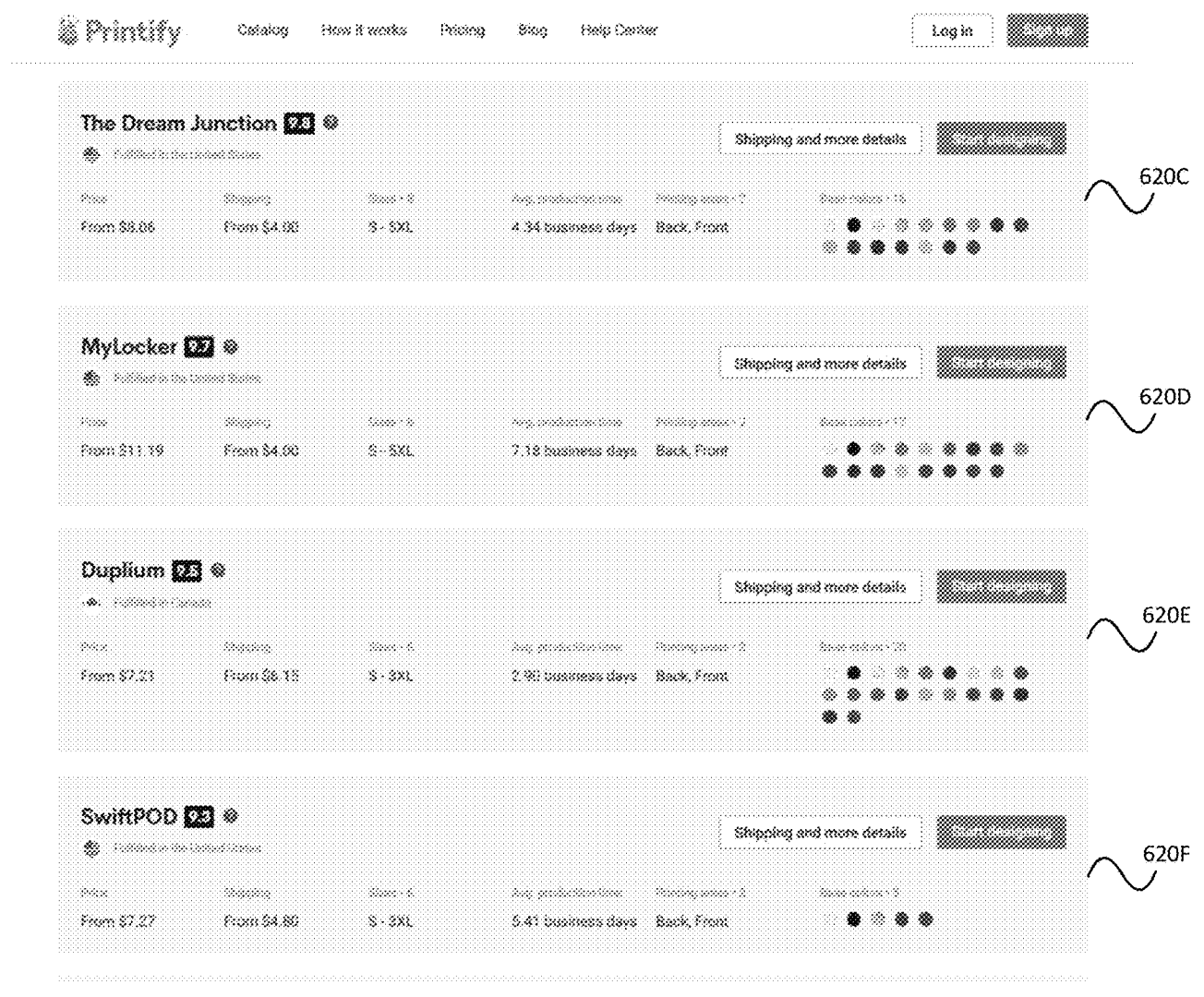
Figure 6C:
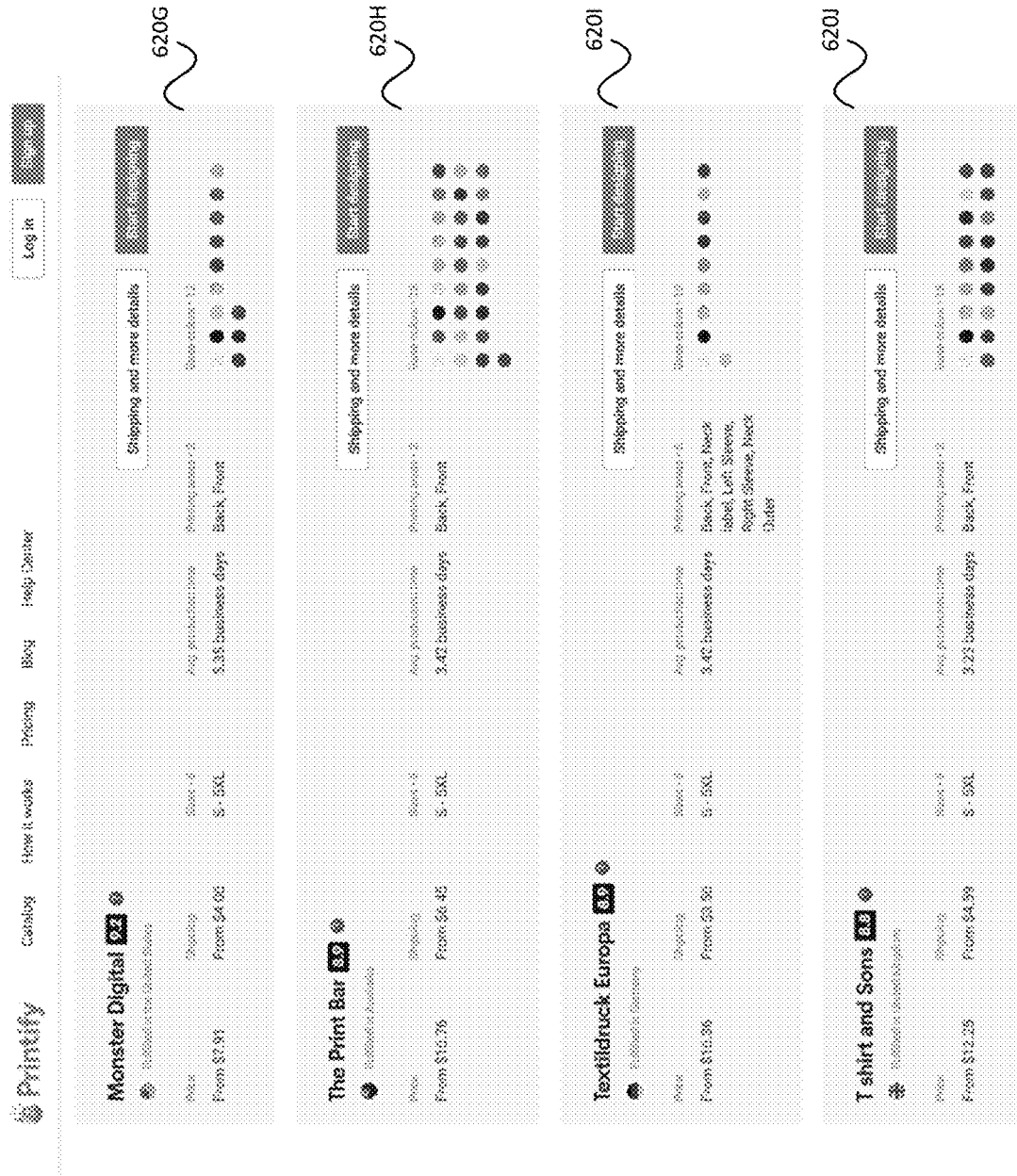
FIG. 6 illustrates the arrangement of FIGS. 6A-6E, which collectively illustrate an example second user interface page.
Figure 6D:
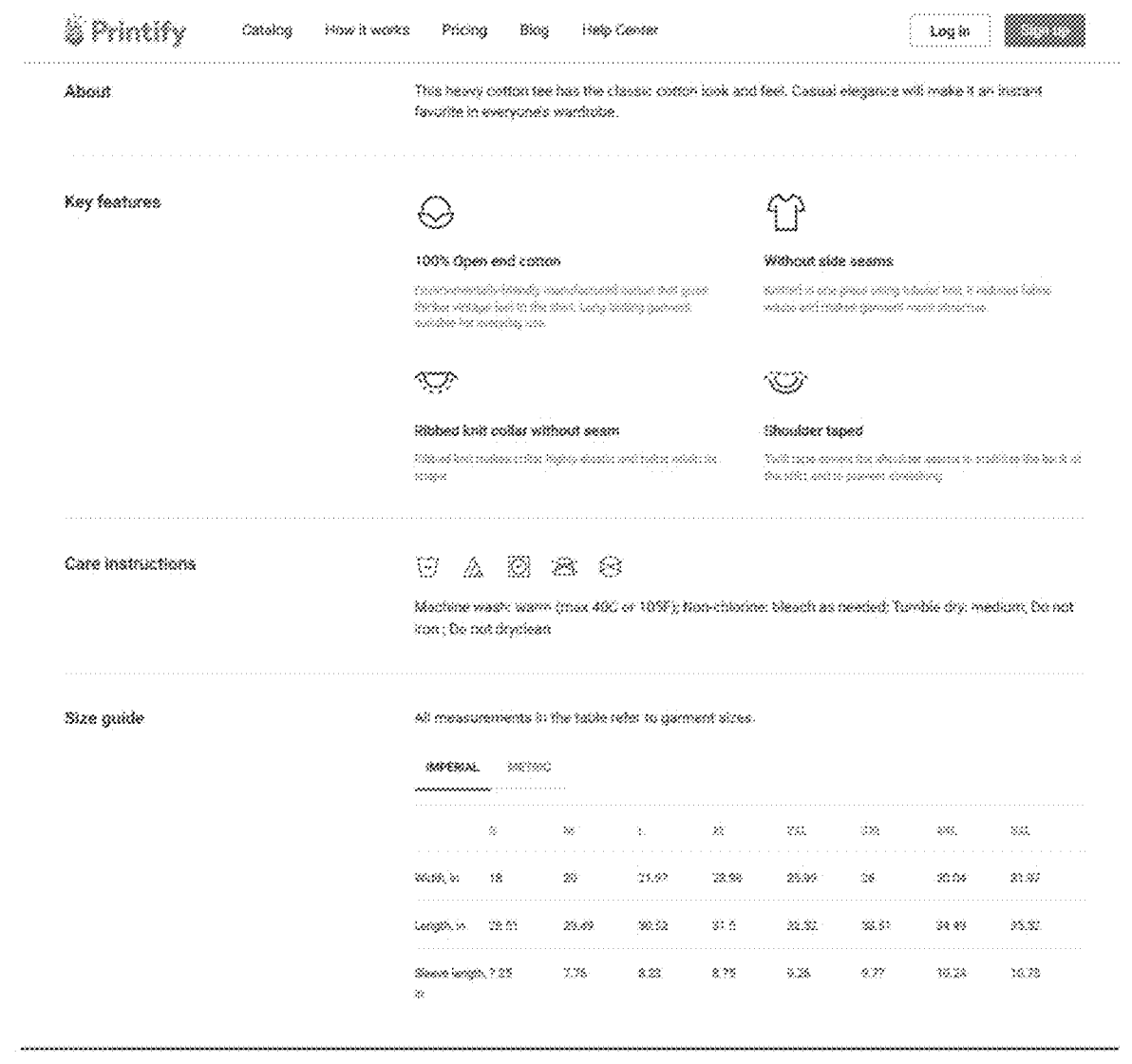
Figure 6E:
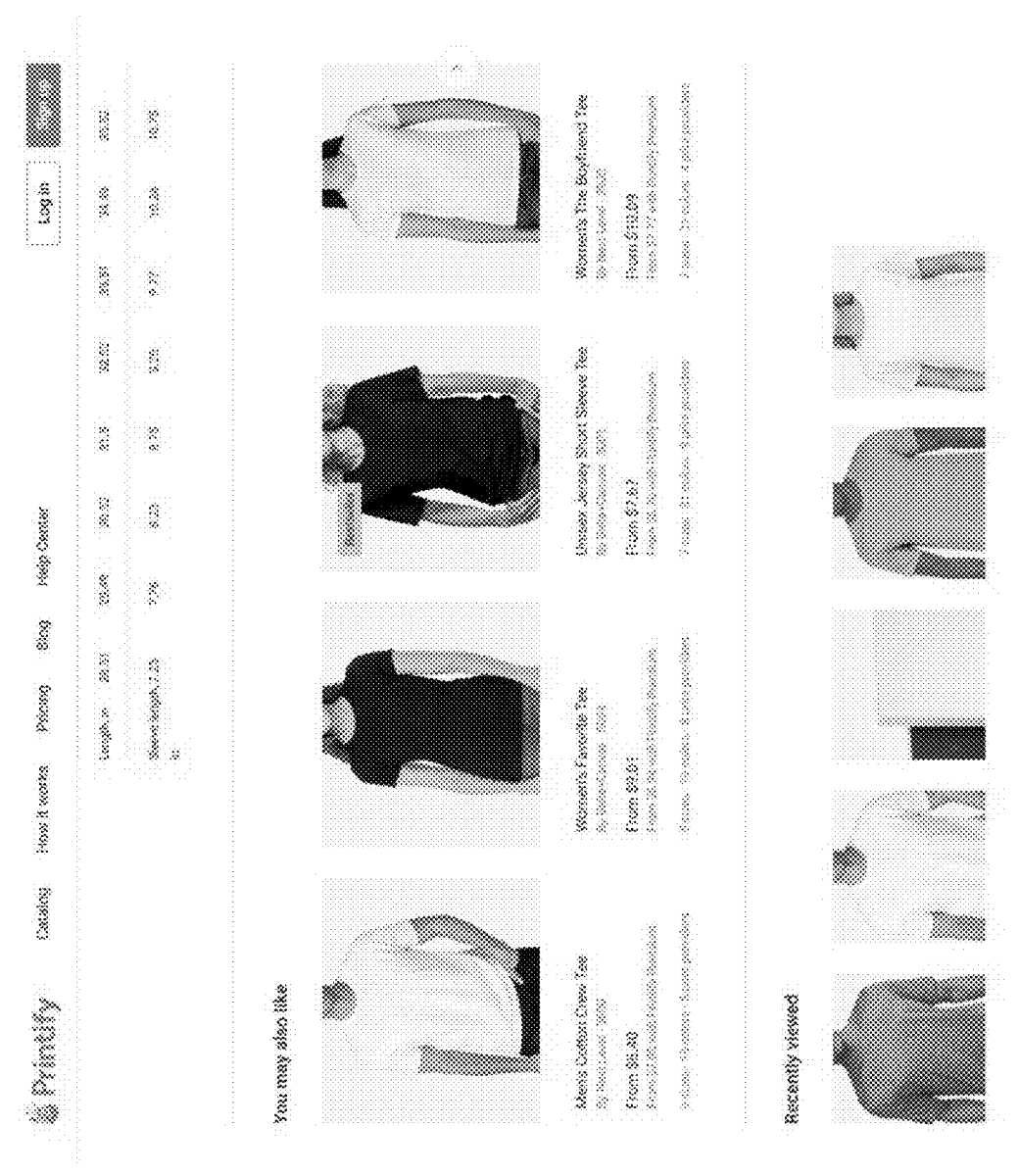

Referring back to event 405, responsive to receiving from the merchant (e.g., designer and/or author) user, a candidate physical product selection, the example method 400B retrieves a set of candidate print provider information for each of at least one candidate print provider of the selected physical product. (Block 455) The example method 400B then transmits a second user interface page including at least one set of candidate print provider information to the merchant. (Block 460) Referring to event 440, responsive to receiving this second user interface page, the example method 400C may render the received second user interface page. (Block 445) FIG. 6, which includes FIGS. 6A-6E, illustrates an example second user interface page 600. As shown in FIG. 6A, this page may include text and/or image(s) of the product 610. As shown in FIGS. 6A-6C, this page may also include information 620A-620J corresponding to a plurality of print providers that offer the selected product. This page 600 may also include additional information, such as that shown in FIGS. 6D and 6E. Referring to FIG. 6A, the information about each of the print providers may include, for example, a name 621 of the print provider, a (e.g., numerical) score 622 associated with the print provider, a geographical area serviced by the print provider 623, a (e.g., minimum) price 624 charged by the print provider for the product, a (e.g., minimum) shipping charge 625 changed by the print provider for the product, sizes or a range of sizes 626 of the product offered by the print provider, a (e.g., average) production time 627 for the product by the print provider, one or more printing areas 628 on the product offered by the print provider, one or more base colors 629 of the product offered by the print provider, a link 630 to further information (e.g., about shipping and further details), and a link 640 to a further user interface for the merchant to apply their design(s) to the product. For example, for the first print provider 620A, the name of the print provider is "Print Geek", its score is 9.8, it services the geographical area of Canada, it's minimum cost for a unisex white cotton t-shirt (printed with the design(s) of the merchant is $10.01, its minimum shipping cost is $7.50, it offers sizes from small (S) to triple extra-large (3XL), its average production time is 1.73 business days, it prints on the front of the t-shirt, and it offers many base colors. Although not shown, in some example embodiments, the user interface may allow a merchant user to filter and/or sort such print provider information. For example, the merchant user might specify that it wants a print provider servicing Germany, with a minimum score of 8.5, sorted by minimum price from least to most expensive. Referring to FIGS. 6A and 4C, suppose the merchant user selects the start designing link 640. In response, the example method 400C transmits the selection back to the hub. (Block 450) The foregoing acts correspond to communications 325 and 330 of FIG. 3.

Figure 7A:
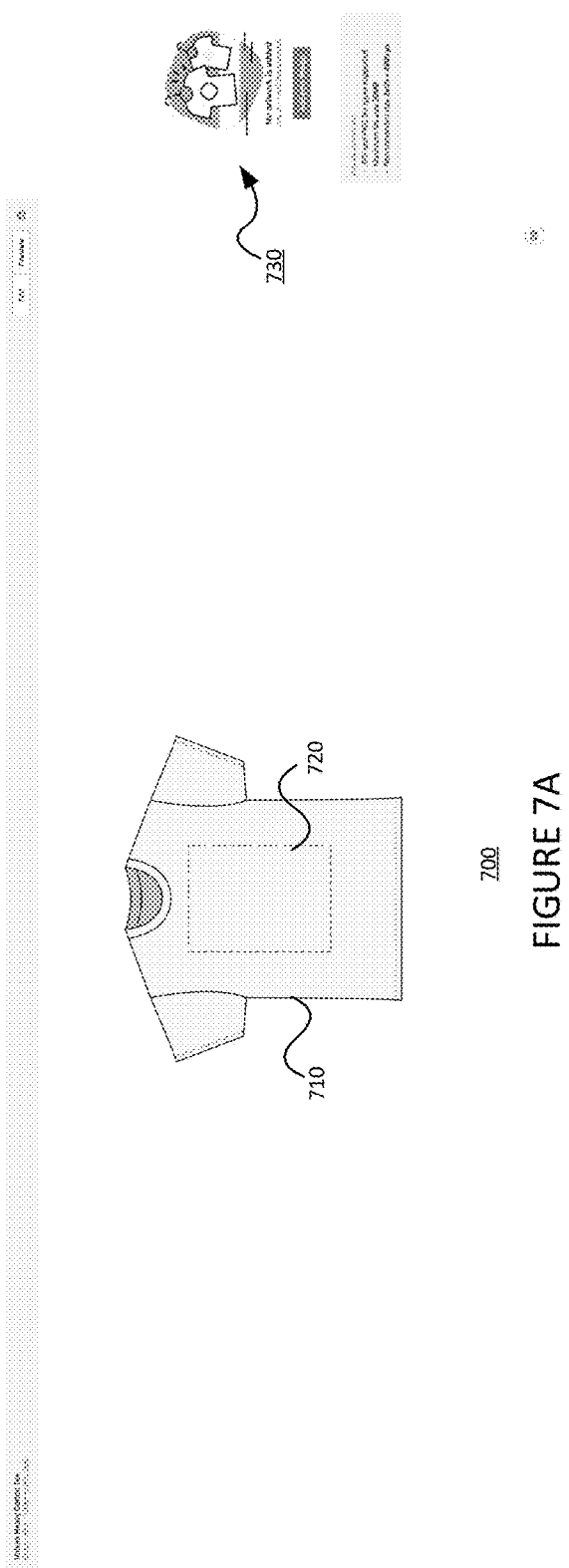
FIGS. 7A and 7B illustrate example third user interface pages.
Figure 7B:
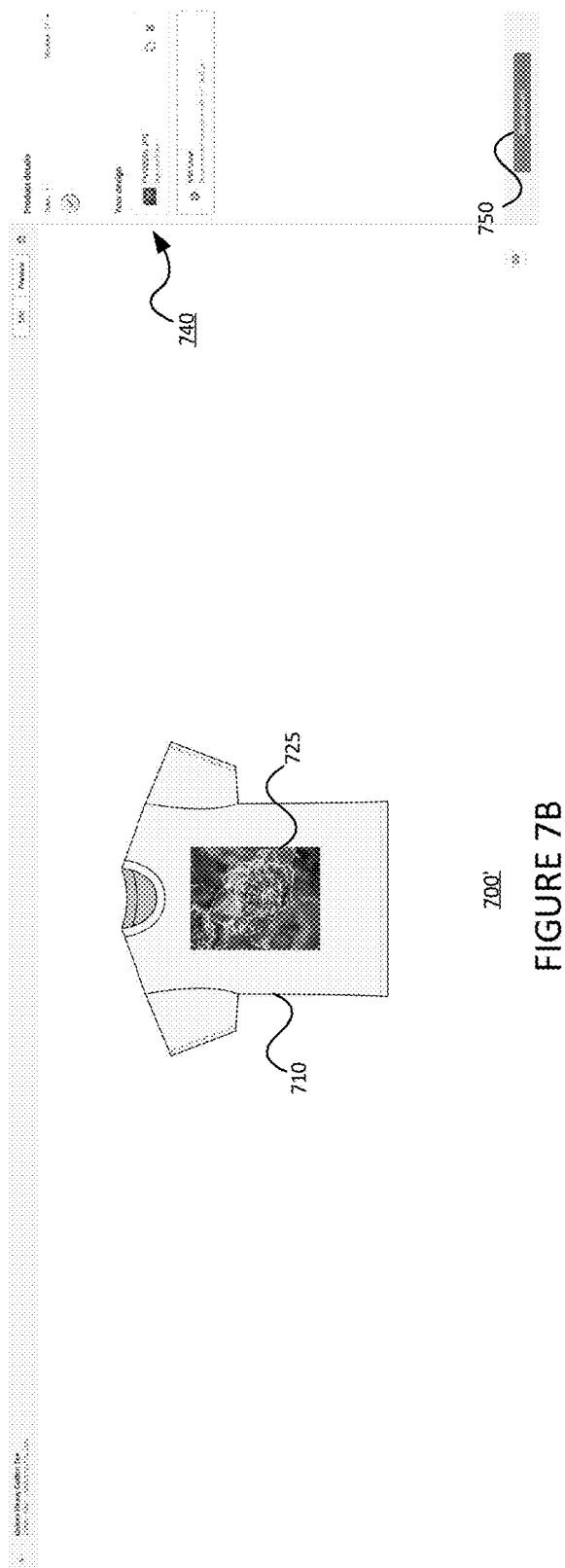

Referring to event 405, responsive to receiving a user selection of one of the set(s) of candidate print providers, the example method 400B transmits a third user interface page for assigning the merchant (e.g., designer and/or author) user to create a designed product. (Block 465) Referring to event 440, upon receiving the third user interface page, the example method 400C renders the received third user interface page. (Block 445) FIGS. 7A and 7B illustrate example third user interface pages 700 and 700', respectively. As shown in FIG. 7A, in a first page 700, a blank t-shirt drawings 710 is shown with an area 720 on which the merchant user may position their design. Area 730 of the page 700 allows the merchant user to browse image files to be uploaded to the hub. FIG. 7B illustrates a page 700' in which an uploaded image 725 is illustrated on a t-shirt drawing 710. Area 740 allows the merchant user to verify the image used in the designed product, as well as interface buttons allowing the merchant user to modify and/or add layers to the design. Button 750 allows the merchant user to save the designed product. Referring back to event 440, when the designed product is complete (or while the design is being input), the example method 400C transmits such information to the hub. (Block 450) Referring to FIG. 3, these acts correspond to communications 335 and 340.

Referring back to event 405, responsive to receiving user product design inputs, the example method 400B generates printed product order file including information derived from the user product design inputs and the selected physical product. (Block 470) The example method 400B then transmits this product order file to the print provider and/or to an online storefront. (Block 475) These acts correspond to communications 345 and 350 of FIG. 3.

Example Print Provider Score Determination Method(s)

Figure 8:
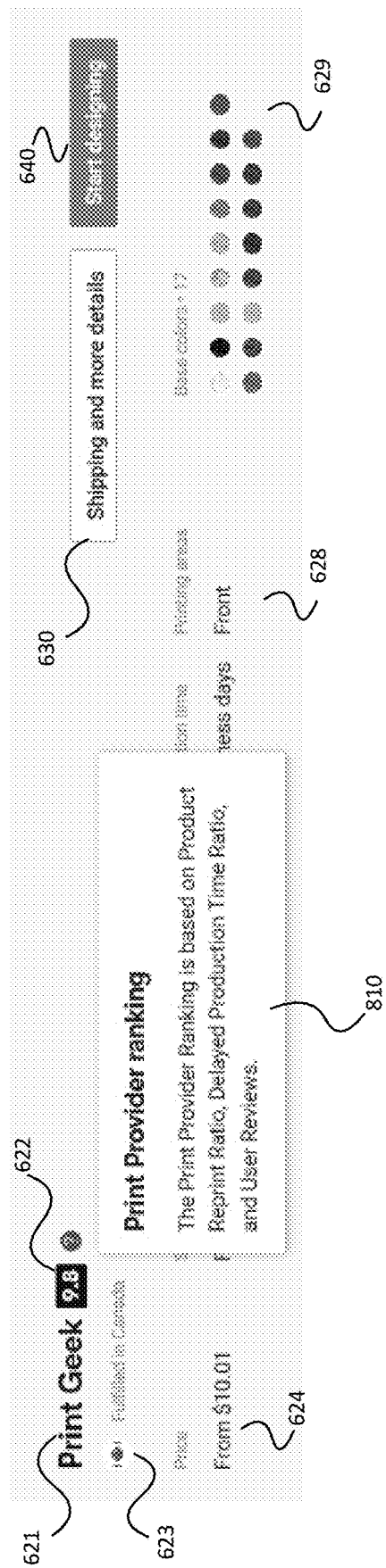
FIG. 8 illustrates information about a part of the example second user interface page.

FIG. 8 illustrates information about a part of the example second user interface page corresponding to information about the first print provider listing 620A. In this example, the question mark next to the score icon 622 was selected and an explanation 810 of the print provider ranking (or score) is provided. This score advantageously combines a number of factors into a single (e.g., numerical) score. This single score 622 provides a single, helpful, composite score, and helps to declutter each print provider listing 620A-620J, conserving screen space. This single score 622 also advantageously reduces the cognitive load on a merchant (designer and/or author) user. The score 622 may be determined in various ways.

Figure 9:
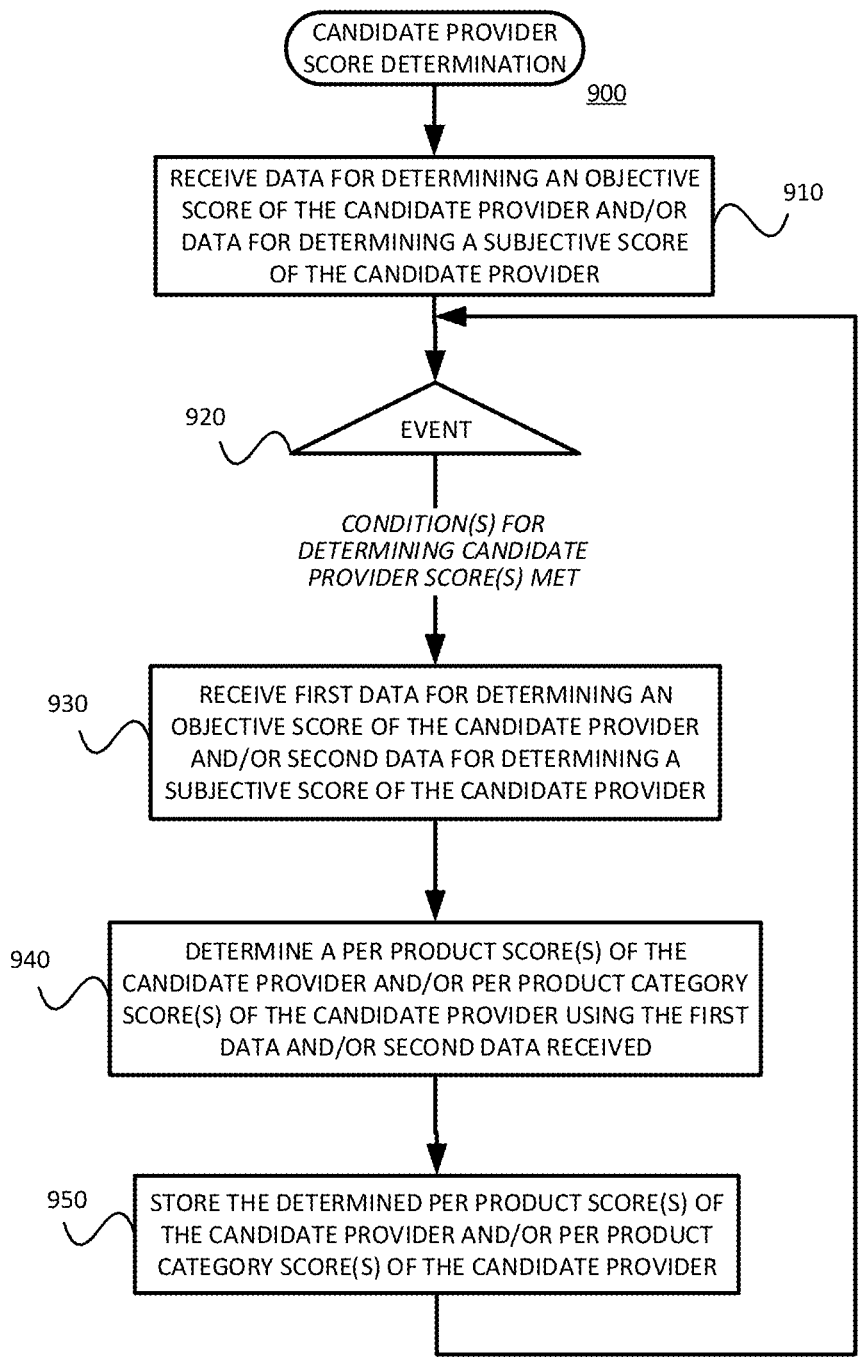
FIG. 9 is a flow diagram of an example method for determining a candidate provider score, such as those illustrated in FIG. 6, in a manner consistent with the present invention.

FIG. 9 is a flow diagram of an example method 900 for determining a candidate print provider score, such as the one 622 illustrated in FIG. 6A, in a manner consistent with the present invention. The example method 900 receives data for determining an objective (e.g., based on measurable and/or historic values, such as time, distance, historic reprint data, historic refund data, historic delivery time data, etc.) score of the candidate print provider and/or data for determining a subjective (e.g., based on user perception(s)) score of the candidate provider. (Block 910) This data is stored as needed. Pieces of this data may be associated with respective times and/or dates. Referring to event block 920, when one or more conditions (e.g., predetermined time of day, predetermined day of week, predetermined day of month, express request, etc.) for determining a candidate provider score is met, the example method 900 receives first data for determining an objective score of the candidate print provider and/or second data for determining a subjective score of the candidate print provider. (Block 930) The example method 900 then determines a per product (and/or per product category) score(s) of the candidate print provider using the first data and/or second data received. Finally, the determined per product (and/or per product category) score(s) of the candidate print provider are stored (and/or transmitted to a requestor). (Block 950)

Referring back to block 910, a "product" may be a particular product, such as men's white cotton V-neck t-shirt, while a "product category" may be some combination of related products, such as all t-shirts, or all white shirts, or all men's shirts, etc.

Referring back to block 950, the candidate print provider score may be a function either one or both of (1) an objective score (determined using the first data), and (2) a subjective score (determined using the second data).

In some example embodiments, the objective score is a function of both (1) a product reprint score associated with the candidate provider, and (2) a delayed production score associated with the candidate provider. For example, the product reprint score associated with the candidate provider may be determined using a ratio of number of reprints of the selected physical product by the candidate provider to a number of orders of the selected physical product from the candidate provider. As another example, the product reprint score associated with the candidate provider is determined using time weighted ratios of number of reprints of the selected physical product by the candidate provider to a number of orders of the selected physical product from the candidate provider. In yet another example, the product reprint score associated with the candidate provider is determined using a ratio of number of reprints of a category of products to which the selected physical product belongs, by the candidate provider, to a number of orders of the category of products to which the selected physical product belongs, from the candidate provider.

In yet still another example, the delayed production score associated with the candidate provider is determined using (1) at least one service level agreement (SLA) violation count of the selected physical product fulfilled by the candidate provider, and (2) a total count of the selected physical product fulfilled by the candidate provider. Such a delayed production score ("Over SLA Ratio") may be determined using the following expression:

$$\text{Over SLA Ratio} = \frac{\text{Number of Products fulfilled over SLA}}{\text{Total Number of Products fulfilled}}$$

For example, the delayed production score associated with the candidate provider may be determined using (1) a weighed combination of service level agreement violation counts of the selected physical product fulfilled by the candidate provider, and (2) a total count of the selected physical product fulfilled by the candidate provider, where service level agreement violation counts associated with longer delays are weighted more heavily than service level agreement violation counts associated with shorter delays. Such a weighted delayed production score ("Weighted Over SLA Ratio") may be determined using the following expression:

$$\text{Weighted Over SLA Ratio} = \frac{a*SLA_{r1} + b*SLA_{r2} + c*SLA_{r3} + d*SLA_{r4} + \ldots n_c*SLA_{rn}}{n}$$

where:

a, b, c, d, and . . . $n_c$ are constants;

a<b<c<d<. . . <$n_c$;

$r_1$, $r_2$, $r_3$, $r_4$ and $r_n$ are over SLA ranges; and n is the number of over SLA ranges.

In one example:

n=4;

a=1.1;

b=1.3;

c=1.5;

d=2;

$$SLA_{r_i} = \frac{\text{Number of Products fulfilled over SLA in range } r_i}{\text{Total Number of Products fulfilled}};$$

$r_1$ is 1 day over SLA;

$r_2$ is 2-4 days over SLA;

$r_3$ is 5-9 days over SLA; and $r_4$ is 10+ days over SLA.

In yet another example, the delayed production score associated with the candidate provider is determined using (1) at least one service level agreement violation count of a category of products to which the selected physical product belongs, fulfilled by the candidate provider, and (2) a total count of a category of products to which the selected physical product belongs, fulfilled by the candidate provider. For example, the delayed production score associated with the candidate provider is determined using (1) a weighed combination of service level agreement violation counts of a category of products to which the selected physical product belongs, fulfilled by the candidate provider, and (2) a total count of a category of products to which the selected physical product belongs, fulfilled by the candidate provider, wherein service level agreement violation counts associated with longer delays are weighted more heavily than service level agreement violation counts associated with shorter delays.

In some example embodiments, the subjective score is a function of user-provided ratings associated with the candidate provider. For example, the user-provided ratings associated with the candidate provider may be a function of one or more of (1) quality ratings of the selected physical product provided by the candidate provider as a sample printed product, (2) a quality rating of printing of the sample printed product, and (3) a fulfillment rating corresponding to the sample printed product, etc.

Example Apparatus

Figure 10:
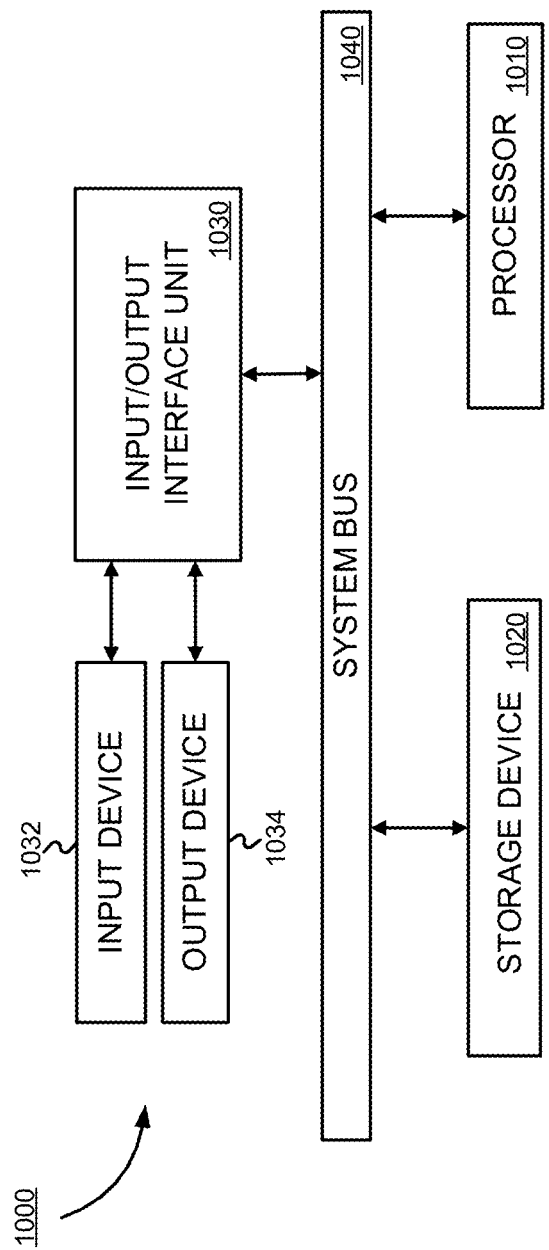
FIG. 10 is a block diagram of an example processor-based system that may be used to execute the example methods and/or to store information used and/or generated by such example methods.

FIG. 10 is a block diagram of an exemplary machine 1000 that may perform one or more of the methods (e.g., 400A, 400B, 400C, 900) described, and/or store information (e.g., 270) used and/or generated by such methods. The exemplary machine 1000 includes one or more processors 1010, one or more input/output interface units 1030, one or more storage devices 1020, and one or more system buses and/or networks 1040 for facilitating the communication of information among the coupled elements. One or more input devices 1032 and one or more output devices 1034 may be coupled with the one or more input/output interfaces 1030. The one or more processors 1010 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 1020 and/or may be received from an external source via one or more input interface units 1030. The machine executable instructions may be stored as various software modules, each module performing one or more operations. Functional software modules are examples of components, which may be used in the apparatus described.

In some embodiments consistent with the present disclosure, the processors 1010 may be one or more microprocessors and/or ASICs. The bus 1040 may include a system bus, one or more networks (e.g., LANs), etc. The storage devices 1020 may include system memory, such as read only memory (ROM) and/or random access memory (RAM). The storage devices 1020 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program, which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, etc. Alternatively, or in addition, embodiments consistent with the present disclosure (or components or modules thereof) might be implemented as stored program instructions executed by a processor. Such hardware and/or software might be provided a laptop computer, desktop computer, a tablet computer, a mobile phone, etc.

Refinements, Alternatives and Extensions

Although the example embodiments were described in the context of print providers, example embodiments consistent with the present description may be used in the context of other providers for applying a merchant (e.g., designer and/or author) user's design onto a physical product, or incorporate the design into a physical product. As some examples, a provider may etch a design onto glass, carve a design into wood, emboss a design onto leather, 3D-print a three dimensional design, sculpt a design onto ice, carve a design into stone, cast a design, etc.

In some example embodiments, a window function may be applied to data used to determine various scores. For example, in one example embodiment, only data from the most recent five week period is used. In other example embodiments, data may be weighted to decrease (e.g., linearly, exponentially, quadratically, etc.) the weight of older data relative to newer data.

Although provider scores may be used for helping a merchant (e.g., designer and/or author) chose a provider, provider scores may be used for alternative and/or additional purposes. For example, a provider score may be used to further enhance the merchant user experience by altering (e.g., by filtering and/or sorting) products presented to the merchant in the first user interface page. (Recall, e.g., FIG. 5.) That is, scores can be used to boost products associated with relatively high scoring providers (in general, regardless of the provider), and/or penalize products associated with relatively low scoring providers (in general, regardless of the provider). As yet another example, provider scores can be used for automated order routing so that the hub 110 can direct the merchant's order to the best provider (or the best provider that meets various criteria, such as geographic region served), or to a set of providers when a relatively large quantity order is to be fulfilled, and is to be distributed over more than one provider.

Although certain factors were described as being used to determine a provider score, other factors may be used instead or, or in addition to, such factor(s). Such factor(s) may include, for example, one or more of (i) a replaceability of the product, (ii) the availability of alternative providers, (iii) production time, (iv) current provider queue, (v) current provider maximum throughput, (vi) current provider average throughput, (vii) amount of inventory stock (e.g., number of blue, men's, V-neck t-shirts), (viii) expected demand for the designed product, (ix) distance of provider to shipping destination, etc.

Conclusions

As should be apparent from the foregoing, example embodiments consistent with the present description may be used to improve user interface technology related to a composite file or page (e.g., Webpage) including information from various entities (e.g., physical product providers) by providing a composite score (determined from one or more constituent parts) for each of the entities in a way that occupies less space than would otherwise been needed if constituent scores of each of the entities were provided. Such example embodiments may also improve user interface technology by reducing the cognitive load on a user reviewing information presented on a composite Webpage. This, in turn, reduces "friction" related to using and interacting with such a composite Webpage. Such example embodiments may also improve user interface technology by presenting information from various different entities in a uniform manner, with a consistent look and feel.

What is claimed is:

1. A computer-implemented method for improving a user interface, the computer-implemented method comprising:
   a) transmitting, for rendering on a user device, a first user interface screen including a plurality of candidate physical products on which to reproduce a design;
   b) receiving, from the user device, a selection input to select one of the plurality of candidate physical products, thereby defining a selected physical product;
   c) responsive to receiving the selection input, retrieving a set of candidate provider information for each of at least one candidate provider of the selected physical product, each set of candidate provider information including (1) a minimum price associated with both the candidate provider and the selected physical product and (2) a candidate provider score;
   d) transmitting, for rendering on the user device, a second user interface screen including the at least one set of candidate provider information retrieved;
   e) receiving, from the user device, a user selection of one of the at least one set of candidate provider information, thereby defining a selected provider;
   f) transmitting, for rendering on the user device, a third user interface screen for assisting the user to create a designed product;
   g) receiving, from the user device, user product design inputs; and
   h) generating an order file including information derived from the user product design inputs received and the selected physical product.

2. The computer-implemented method of claim 1, further comprising:
   i) transmitting the order file to the selected provider.

3. The computer-implemented method of claim 2, further comprising:
   j) publishing at least some of the information in the order file to at least one online store platform.

4. The computer-implemented method of claim 1, wherein the candidate provider score is a function of at least one of (1) an objective score, and (2) a subjective score.

5. The computer-implemented method of claim 1, wherein the candidate provider score is a function of both (1) a product reprint score associated with the candidate provider, and (2) a delayed production score associated with the candidate provider.

6. The computer-implemented method of claim 5 wherein the product reprint score associated with the candidate provider is determined using a ratio of number of reprints of the selected physical product by the candidate provider to a number of orders of the selected physical product from the candidate provider.

7. The computer-implemented method of claim 5 wherein the product reprint score associated with the candidate provider is determined using time weighted ratios of number of reprints of the selected physical product by the candidate provider to a number of orders of the selected physical product from the candidate provider.

8. The computer-implemented method of claim 5 wherein the product reprint score associated with the candidate provider is determined using a ratio of number of reprints of a category of products to which the selected physical product belongs by the candidate provider to a number of orders of the category of products to which the selected physical product belongs from the candidate provider.

9. The computer-implemented method of claim 5 wherein the delayed production score associated with the candidate provider is determined using (1) at least one service level agreement violation count of the selected physical product fulfilled by the candidate provider, and (2) a total count of the selected physical product fulfilled by the candidate provider.

10. The computer-implemented method of claim 9 wherein the delayed production score associated with the candidate provider is determined using (1) a weighed combination of service level agreement violation counts of the selected physical product fulfilled by the candidate provider, and (2) a total count of the selected physical product fulfilled by the candidate provider, wherein service level agreement violation counts associated with longer delays are weighted more heavily than service level agreement violation counts associated with shorter delays.

11. The computer-implemented method of claim 5 wherein the delayed production score associated with the candidate provider is determined using (1) at least one service level agreement violation count of a category of products to which the selected physical product belongs fulfilled by the candidate provider, and (2) a total count of a category of products to which the selected physical product belongs fulfilled by the candidate provider.

12. The computer-implemented method of claim 11 wherein the delayed production score associated with the candidate provider is determined using (1) a weighed combination of service level agreement violation counts of a category of products to which the selected physical product belongs fulfilled by the candidate provider, and (2) a total count of a category of products to which the selected physical product belongs fulfilled by the candidate provider, wherein service level agreement violation counts associated with longer delays are weighted more heavily than service level agreement violation counts associated with shorter delays.

13. The computer-implemented method of claim 1, wherein the candidate provider score is a function of user-provided ratings associated with the candidate provider.

14. The computer-implemented method of claim 13 wherein the user-provided ratings associated with the candidate provider are a function of (1) quality ratings of the selected physical product provided by the candidate provider as a sample printed product, (2) a quality rating of printing of the sample printed product, and (3) a fulfillment rating corresponding to the sample printed product.

15. The computer-implemented method of claim 1 wherein each set of candidate provider information further includes a minimum shipping price for the selected physical product.

16. The computer-implemented method of claim 1 wherein each set of candidate provider information further includes a production time value for the selected physical product.

17. The computer-implemented method of claim 1 wherein each set of candidate provider information further includes one or more areas of the selected physical product on which the design in the digital design file may be reproduced by the candidate provider.

18. The computer-implemented method of claim 1 wherein each set of candidate provider information further includes a geographic area in which the candidate provider delivers the selected physical product.

19. The computer-implemented method of claim 1 wherein each set of candidate provider information further includes base colors of the selected physical product offered by the candidate provider.

20. The computer-implemented method of claim 1 wherein each of the at least one set of candidate provider information rendered on the second user interface screen has the same look and feel, regardless of the candidate provider.

21. The computer-implemented method of claim 1 wherein each of the at least one set of candidate provider information rendered on the second user interface screen includes a visually perceptible minimum price element and a visually perceptible candidate provider score element.

22. The computer-implemented method of claim 1 wherein each of the at least one set of candidate provider information rendered on the second user interface screen are sorted and/or filtered based on their corresponding candidate provider scores.

23. A server including:
a) a communications interface;
b) at least one processor; and
c) a storage device storing processor-executable instructions which, when executed by the at least one processor, cause the at least one processor to perform a method for improving a user interface, the method including
1) transmitting, for rendering on a user device, a first user interface screen including a plurality of candidate physical products on which to reproduce a design,
2) receiving, from the user device, a selection input to select one of the plurality of candidate physical products, thereby defining a selected physical product,
3) responsive to receiving the selection input, retrieving a set of candidate provider information for each of at least one candidate provider of the selected physical product, each set of candidate provider information including (1) a minimum price associated with both the candidate provider and the selected physical product and (2) a candidate provider score,
4) transmitting, for rendering on the user device, a second user interface screen including the at least one set of candidate provider information retrieved,
5) receiving, from the user device, a user selection of one of the at least one set of candidate provider information, thereby defining a selected provider,
6) transmitting, for rendering on the user device, a third user interface screen for assisting the user to create a designed product,
7) receiving, from the user device, user product design inputs, and 8) generating an order file including information derived from the user product design inputs received and the selected physical product.

24. A non-transitory computer-readable storage medium storing processor-executable instructions which, when executed by at least one processor, cause the at least one processor to perform a method for improving a user interface, the method comprising:
- a) transmitting, for rendering on a user device, a first user interface screen including a plurality of candidate physical products on which to reproduce a design;
- b) receiving, from the user device, a selection input to select one of the plurality of candidate physical products, thereby defining a selected physical product;
- c) responsive to receiving the selection input, retrieving a set of candidate provider information for each of at least one candidate provider of the selected physical product, each set of candidate provider information including (1) a minimum price associated with both the candidate provider and the selected physical product and (2) a candidate provider score;
- d) transmitting, for rendering on the user device, a second user interface screen including the at least one set of candidate provider information retrieved;
- e) receiving, from the user device, a user selection of one of the at least one set of candidate provider information, thereby defining a selected provider;
- f) transmitting, for rendering on the user device, a third user interface screen for assisting the user to create a designed product;
- g) receiving, from the user device, user product design inputs; and
- h) generating an order file including information derived from the user product design inputs received and the selected physical product.

* * * * *